(12) United States Patent
Carroll et al.

(10) Patent No.: US 9,677,973 B1
(45) Date of Patent: Jun. 13, 2017

(54) METHOD AND APPARATUS FOR ENVIRONMENTAL PROTECTION OF DRIVE-OVER TIRE TREAD DEPTH OPTICAL SENSORS

(71) Applicant: Hunter Engineering Company, St. Louis, MO (US)

(72) Inventors: Craig A. Carroll, O'Fallon, MO (US); Michael T. Stieff, Wentzville, MO (US)

(73) Assignee: Hunter Engineering Company, St. Louis, MO (US)

( * ) Notice: Subject to any disclaimer, the term of this patent is extended or adjusted under 35 U.S.C. 154(b) by 310 days.

(21) Appl. No.: 14/625,345

(22) Filed: Feb. 18, 2015

Related U.S. Application Data (63) Continuation of application No. 14/185,181, filed on Feb. 20, 2014, now Pat. No. 9,046,446.

(60) Provisional application No. 61/768,194, filed on Feb. 22, 2013.

(51) Int. Cl.
*G01M 17/02* (2006.01)
*G01B 11/22* (2006.01)

(52) U.S. Cl.
CPC .......... *G01M 17/027* (2013.01); *G01B 11/22* (2013.01)

(58) Field of Classification Search
None
See application file for complete search history.

(56) References Cited

U.S. PATENT DOCUMENTS

| | | |
|---|---|---|
| 5,101,754 A | 4/1992 | Bartscher et al. |
| 5,274,355 A | 12/1993 | Galan |
| 5,987,978 A | 11/1999 | Whitehead |
| 6,062,072 A | 5/2000 | Mock et al. |
| 6,081,324 A | 6/2000 | Yagita et al. |
| 6,870,471 B2 | 3/2005 | Bergerhoff et al. |
| 6,944,908 B2 | 9/2005 | Hoetzer et al. |
| 7,235,123 B1 | 6/2007 | Biegelsen |
| 7,273,082 B2 | 9/2007 | White et al. |
| 7,518,714 B2 | 4/2009 | Voeller et al. |

(Continued)

FOREIGN PATENT DOCUMENTS

| | | |
|---|---|---|
| DE | 4316984 A1 | 8/1994 |
| DE | 19705047 A1 | 8/1998 |

(Continued)

*Primary Examiner* — Peter Macchiarolo
*Assistant Examiner* — Jermaine Jenkins
(74) *Attorney, Agent, or Firm* — Polster, Lieder, Woodruff & Lucchesi LC (57) ABSTRACT

A drive-over tire tread depth measurement system is configured with environmental protection components for preventing or impeding environmental contaminates from falling through openings in a vehicle support surface or cover plate onto underlying components such as sensor optical windows and adjacent surfaces. The environmental protection components may include air discharge assemblies, movable shields, guards, wipers or deflectors such as drip edges, water-accumulating textured surfaces, flow diverters, and selectively placed flanges or fixed guards which operate cooperatively to displace accumulated contaminates, debris, or liquids from the optical windows and adjacent sensor surfaces. A portion of the vehicle support surface or cover plate is removable to permit access to underlying components.

20 Claims, 7 Drawing Sheets

(56) References Cited

U.S. PATENT DOCUMENTS

| | | |
|---|---|---|
| 7,575,773 B2 | 8/2009 | Ishizuka et al. |
| 7,578,180 B2 | 8/2009 | Lionetti et al. |
| 7,975,540 B2 | 7/2011 | Angell et al. |
| 8,171,783 B2 | 5/2012 | Tracy |
| 8,576,060 B2 | 11/2013 | Deniau et al. |
| 8,621,919 B2 | 1/2014 | Pingel |
| 8,625,105 B2 | 1/2014 | Pryce et al. |
| 9,452,739 B2 * | 9/2016 | Kikuta ................... B60S 1/52 |
| 2007/0169818 A1 | 7/2007 | Badstue |
| 2012/0204632 A1 | 8/2012 | Kirstätter |
| 2014/0104426 A1 | 4/2014 | Boegel et al. |
| 2014/0232852 A1 | 8/2014 | Nobis et al. |

FOREIGN PATENT DOCUMENTS

| | | |
|---|---|---|
| EP | 0469948 B1 | 10/1995 |
| EP | 1952092 B1 | 4/2009 |
| WO | 9610727 A1 | 4/1996 |
| WO | 9707380 A2 | 2/1997 |
| WO | 2010115390 A1 | 10/2010 |
| WO | 2013007479 A1 | 1/2013 |
| WO | 2014095142 A1 | 6/2014 |
| WO | 2014114403 A1 | 7/2014 |

* cited by examiner

METHOD AND APPARATUS FOR ENVIRONMENTAL PROTECTION OF DRIVE-OVER TIRE TREAD DEPTH OPTICAL SENSORS

CROSS-REFERENCE TO RELATED APPLICATIONS

The present application is a continuation of, and claims priority from, co-pending U.S. patent application Ser. No. 14/185,181 filed on Feb. 20, 2014, and which in turn is related to, and claims priority from, U.S. Provisional Patent Application Ser. No. 61/768,194 filed on Feb. 22, 2013. Each of the aforementioned applications are incorporated herein by reference.

STATEMENT REGARDING FEDERALLY SPONSORED RESEARCH

Not Applicable.

BACKGROUND OF THE INVENTION

The present invention is related to optical sensors disposed within a surface over which vehicles are driven, which are exposed to environmental conditions, and in particular, to methods and apparatus for protecting optical surfaces from environmental debris and for the automatic clearing of accumulated environmental debris from the optical surfaces.

The use of optical sensors for the acquisition of data associated with motor vehicle are becoming prevalent in the automotive service industry and for use in monitoring vehicular traffic. For some applications, such as the acquisition of data associated with vehicle wheels, and in particular, tire conditions, the optical sensors are disposed in, or below, a supporting surface over which the vehicle wheels roll, such as a roadway surface, vehicle service bay floor, or vehicle service/inspection support structure. Embedded or drive-over optical sensors may include components for projecting illuminating energy towards and onto the surfaces of a passing vehicle, as well as receiving components for capturing reflected energy from the passing vehicle. For example, some tire tread depth measurement systems consist of a laser emitter configured to project a laser light onto or across the surface of a tire passing over the optical sensor, and a cooperatively configured imaging sensor disposed in proximity for acquiring images of the projected laser light reflected from the passing tire.

Optical sensors disposed in a drive-over configuration, where a vehicle is driven or rolled over the sensor, are typically contained within a sealed housing having one or more panels of optically transparent material such as glass or plastic through with illuminating light is projected and/or reflected light is observed. While such sealed housings function well to provide protection against water or debris intrusion and damage to the sensors, performance of the sensors can be degraded to the point of inoperability by the accumulation of environmental contaminants, such as dust, dirt, rocks, salt, and water on the optically transparent panels. Such accumulations of environmental contaminates can occlude the optical lines of sight for both emitter components and imaging components.

Accordingly, it would be advantageous to provide optical sensors, disposed in a drive-over configuration, with components for preventing or impeding environmental contaminates from falling onto the panels of optically transparent material and adjacent sensor surfaces. The mechanisms may be either active mechanisms, in the form of movable shields, guards, or deflectors, or passive components such as drip edges, water-accumulating textured surfaces, flow diverters, or selectively placed flanges or fixed guards.

It would be further advantageous to provide optical sensors, disposed in a drive-over configuration, with a mechanism for selectively shielding the panels of optically transparent material during periods of inactivity. In one embodiment, the shielding mechanism is recessed below the surface over which a vehicle is driven in order to isolate the shielding mechanism from direct contact with the vehicle wheels.

It would be further advantageous to provide optical sensors, disposed in a drive-over configuration, with a mechanism for cleaning and/or clearing of environmental contaminates from the exposed surface of the panels of optically transparent material and adjacent surfaces.

BRIEF SUMMARY OF THE INVENTION

Briefly stated, the present disclosure sets forth a mechanism for selectively shuttering openings in a vehicle supporting surface through which underlying optical sensors emit or receive light energy during acquisition of data associated with vehicle. The mechanism includes at least one shutter panel which is selectively movable between an open position, in which the opening is unobstructed, and a closed position in which the opening is at least partially blocked by the shutter panel to prevent or deflect environmental contaminates such as dust, dirt, rocks, salt, or water from passing downward through the openings and onto the surface of the underlying optical sensors. When in the closed position, the shutter panel remains recessed below the vehicle supporting surface.

In an alternate embodiment, optical sensors disposed below a vehicle supporting surface in a drive-over configuration are protected against environmental contaminates by passive components such as drip edges, water-accumulating textured surfaces, flow diverters, selectively placed flanges and/or fixed guards which are disposed on various surfaces below the vehicle supporting surface, in proximity to openings there in through which the optical sensors transmit or receive light.

In a further embodiment, optical sensors disposed in a drive-over configuration are provided with a mechanism for cleaning and/or clearing of environmental contaminates from surfaces disposed below the openings in the vehicle supporting surface. The mechanism may be operated periodically on a selected cycle, upon each use by activation of a drive-over trigger, or on an as-needed basis, controlled either by the operator or a feedback system evaluating the integrity of emitted and/or reflected light at the optical sensor. To clean and/or clear the environmental contaminates from the surfaces, the mechanism selectively discharges a flow of high-pressure air or an air/fluid mixture across the surfaces to be cleared or cleaned, to transport accumulated debris off the surfaces and into an adjacent discharge region.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 1:
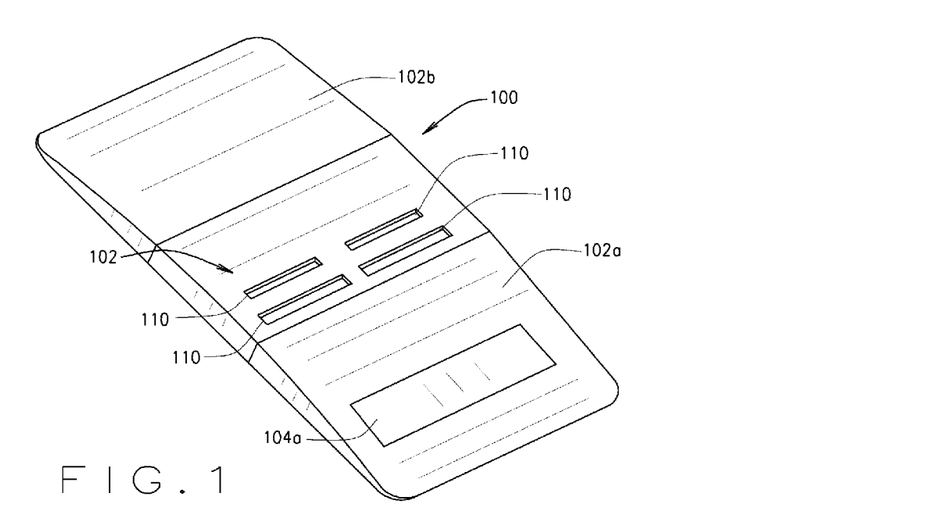
FIG. 1 is a perspective illustration of an embodiment of a drive-over tire tread depth optical sensor system.
Figure 2:
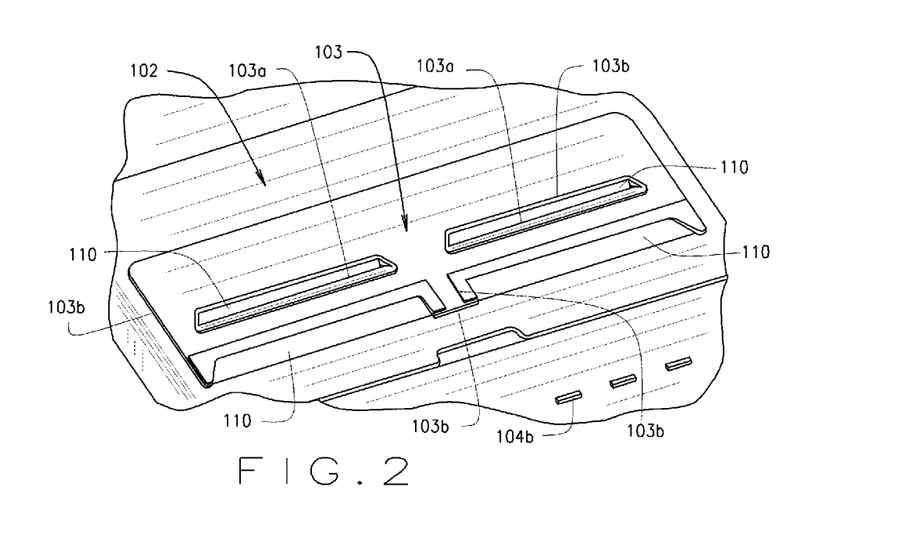
FIG. 2 is a perspective illustration of the vehicle support surface/cover plate of an embodiment of the drive-over tire tread depth optical sensor system.

Turning to the Figures, and to FIGS. 1 and 2 initially, an exemplary drive-over tire tread depth optical sensor system is shown generally at 100. The sensor system consists of a vehicle support surface 102 for supporting the wheels of a vehicle being driven over the sensor system. A cover plate or deflector 103 may be disposed on a portion of the vehicle support surface 102, and configured to divert water accumulating on the vehicle support surface 102 from entering the sensor system 100. Suitable ramps 102a, 102b may be provided if the sensor system 100 is disposed on a floor surface. Alternatively, the sensor system 100 may be disposed in a recessed portion of a floor or roadway surface, with the vehicle support surface 102 substantially coplanar with the adjacent floor or roadway surfaces. Suitable trigger mechanisms 104a, 104b for activating the sensor system 100 may be incorporated into the vehicle support surface 102, ramps 102a, 102b, or adjacent floor or roadway surfaces. The entire vehicle support surface 102, or at least a portion thereof, may be configured to be opened or removed, allowing access to the underlying components of the sensor system for manual cleaning, repair, or replacement as necessary from time to time.

Figure 3:
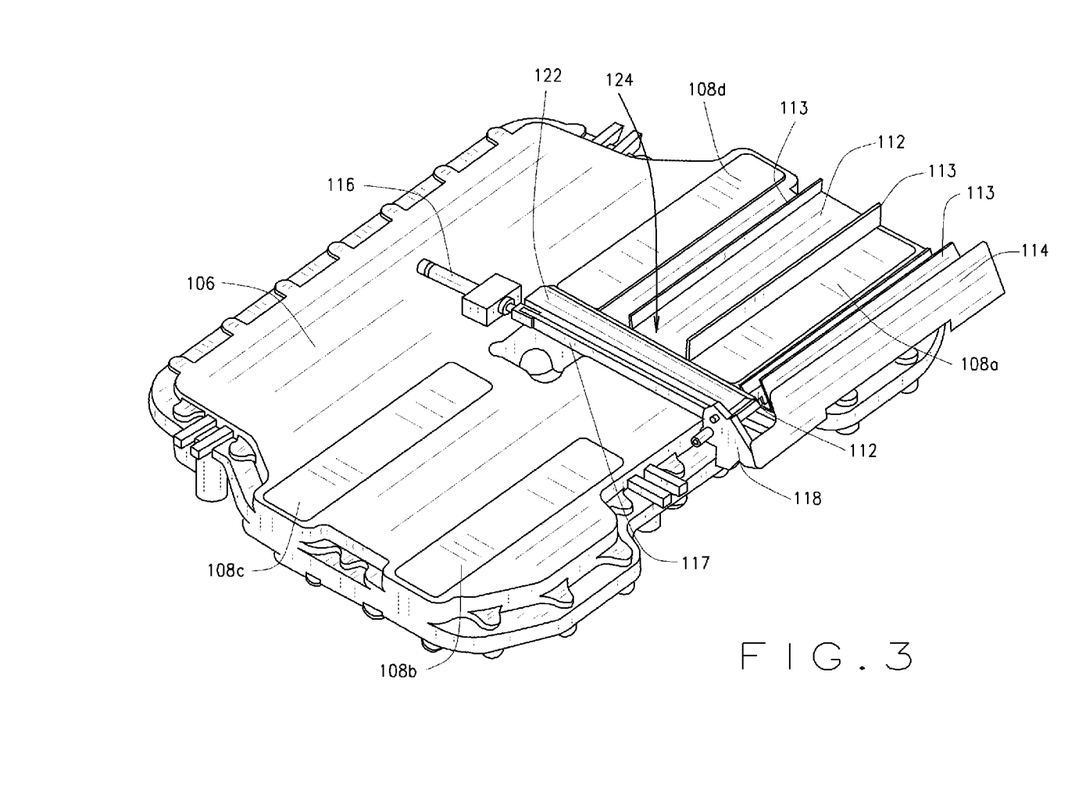
FIG. 3 is a perspective illustration of an embodiment of the drive-over tire tread depth optical sensor system, with the vehicle support surface/cover plate removed, showing the sensor housing with environmental protection features installed adjacent one pair of optical windows only for comparison.
Figure 4:
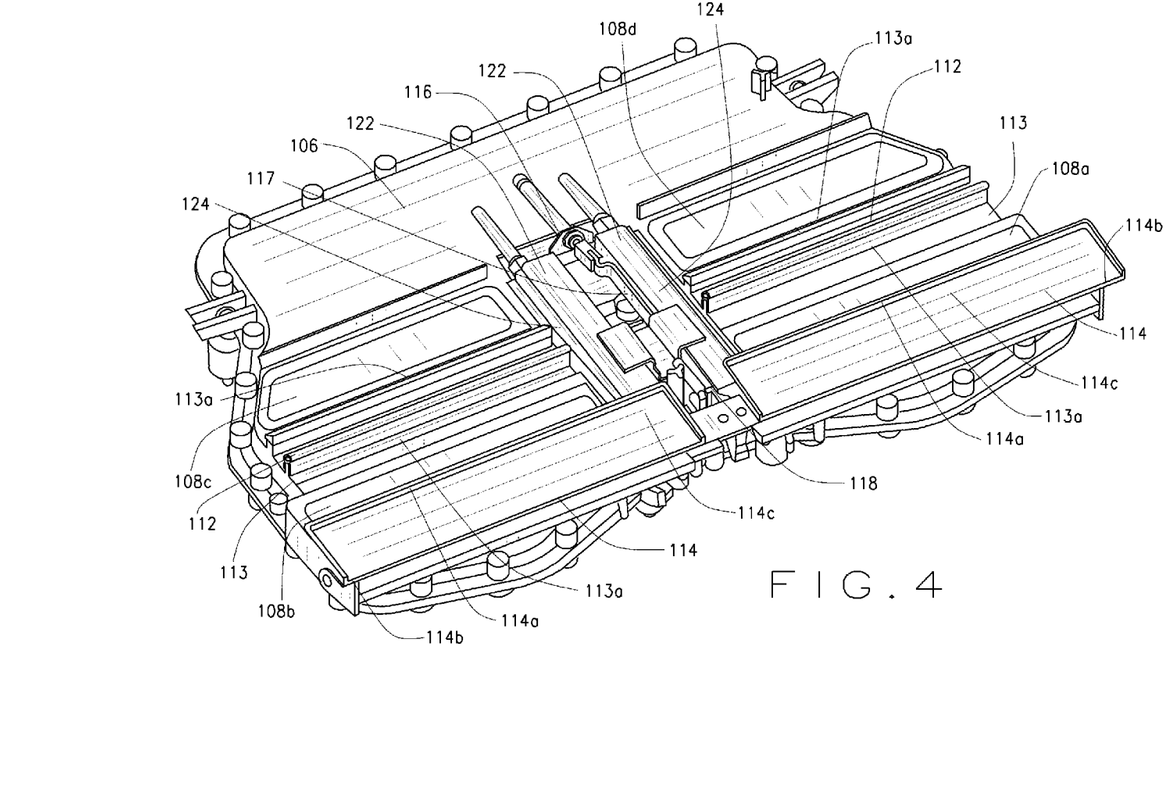
FIG. 4 is a perspective illustration of another embodiment of the drive-over tire tread depth optical sensor system, showing a sensor housing with a complete set of environmental protection features installed.

As seen in FIGS. 3 and 4, the various electronic and optical components which comprise the sensor system 100 are disposed within an environmentally sealed sensor housing 106, positioned below the vehicle support surface 102 and/or cover plate 103. The sensor housing 106 may be mounted directly on the underlying base structure, or may be mounted in a configuration which is biased against an underside surface of the vehicle support surface 102 and/or cover plate 103 to maintain a predetermined position and orientation relative to the vehicle support surface 102 and/or cover plate 103 which may undergo deflection under load from a passing vehicle.

Optical components (not shown) disposed within the sealed sensor housing 106 are positioned and oriented to transmit and/or receive light along associated fields of view through one or more optical windows 108 which are disposed in the upper surface of the sealed housing 106. In the embodiment shown in the Figures, a total of four optical windows 108a-108d are shown in the sensor housing 106, arranged in 2×2 grid configuration. With a longitudinal axis aligned in the normal direction of vehicle travel over the sensor system 100, the longitudinally forward optical windows 108a, 108b (those over which the vehicle will pass first in the normal direction of travel) in each longitudinally aligned pair of optical windows is associated with an optical imaging sensor (not shown) for acquiring images from an associated field of view oriented towards the approaching vehicle. The longitudinally rearward optical windows 108c, 108d in each longitudinally aligned pair of optical windows is associated with a laser emitter system (not shown) for projecting laser illumination along an optical axis towards the tire tread surface of a vehicle passing over the vehicle support surface 102 and/or cover plate 103. The laser emitter system is aligned to illuminate the tire tread surface of an approaching vehicle within the field of view of the associated optical imaging sensor.

Figure 5:
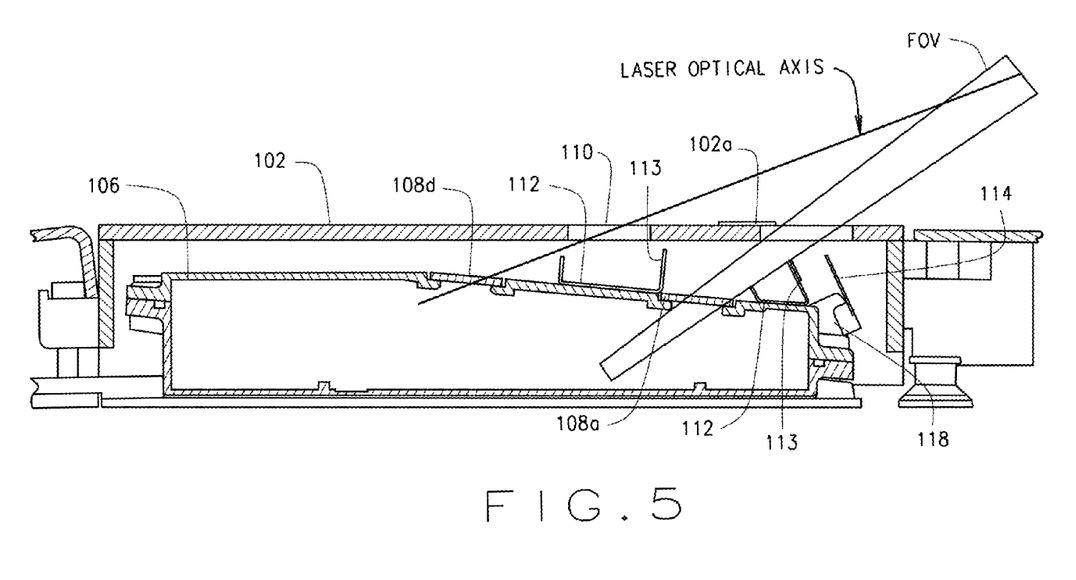
FIG. 5 is a side sectional view of an embodiment of the drive-over tire tread depth optical sensor system, illustrating the optical field of view and laser projection pathway through the openings in the vehicle support surface/cover plate.
Figure 9:
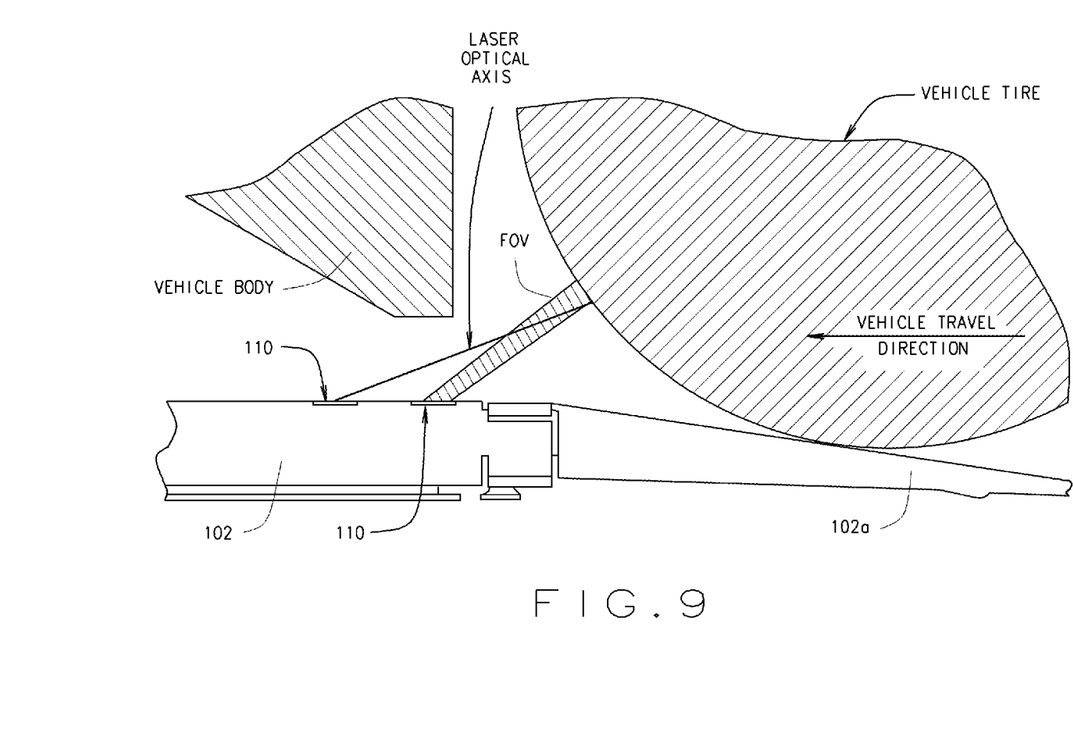
FIG. 9 is a representation of the angular relationships between a surface of an approaching vehicle wheel, a vehicle air dam, the laser projection pathway, and the optical field of view from the drive-over tread depth optical sensor system of the present disclosure.

As best seen in FIGS. 5 and 9, the fields of view and optical axis associated with each pair of longitudinally aligned optical windows 108 are aligned at acute angles relative to the vehicle support surface 102 or cover plate 103, and pass through suitably sized openings 110 in the vehicle support surface 102 or cover plate 103. The acute angles are selected to enable the laser optical axis to intersect the surface of an approaching vehicle tire within a region on the tire surface which falls within the optical imaging sensor field of view, before the vehicle tire is directly over the optical windows 108a-d, and which is at a sufficient angle to avoid obstruction from adjacent vehicle body components, such as an air dam or mud flaps. Those of ordinary skill will recognized that the number and arrangement of the optical windows 108 may vary depending upon the particular configuration of the sensor system 100.

In the embodiment illustrated in FIGS. 1 and 2, it will be noted that a driver-over trigger mechanism 104a or 104b is disposed to activate the sensor assembly 100 as a vehicle wheel approaches the openings 110, and that the laser optical axis and the optical imaging sensor field of view are oriented to intersect a leading edge of the tire tread surface as the tire rotates towards the openings 110 when the vehicle is driven in the forward direction. With this configuration, an increasingly larger portion of the optical sensor field of view is occupied by the tire tread surface as the vehicle moves forward, increasing the shielding of the optical imaging sensor from external light sources, such as the sun, which could result in glare or noise in images acquired by the optical imaging sensor. An additional benefit of acquiring images from the tire tread surface as the vehicle travels in the forward direction towards the sensor windows 108a, 108b is that there is a reduced chance for either the laser optical axis and/or the imaging sensor field of view to be obstructed by a vehicle body component. Typically, lower body panels and/or mud flaps disposed on the rearward side of vehicle wheels will reduce the amount of the tire surface visible to the optical imaging sensor field of view if a vehicle approaches the sensor windows 108a, 108b in a reverse direction.

The acute angles of the laser optical axis and the optical imaging sensor field of view relative to the vehicle support surface 102 or cover plate 103 permit the optical windows 108 in the sensor housing 106 to be longitudinally displaced relative to the corresponding openings 110 in the vehicle support surface 102 or cover plate 103, as best seen in FIG. 5. As such, environmental contaminates or debris falling directly downward into the unobstructed openings 110 in the vehicle support surface 102 or cover plate 103 generally will not land on the optical windows 108, but will accumulate on the upper surface of the sensor housing 106 in adjacent proximity there to. Absent any preventative measures, the accumulated environmental contaminates may flow or migrate onto the exposed upper surfaces of the optical windows 108, degrading system performance and/or occluding either the laser optical axis or optical imaging sensor field of view.

Turning to FIGS. 3 and 4, a variety of features and preventive measures are employed in association with the sensor housing 106, vehicle support surface 102, and the cover plate 103 for protection of the optical surfaces from an accumulation of environmental contaminates and debris. It will be understood that while the present disclosure illustrates specific protective features, sensors systems 100 may incorporate different protective features described herein, as well as different numbers and combinations of the described protective features as necessitated by the sensor system configuration and operating conditions without departing from the scope of the present disclosure.

Figure 8:
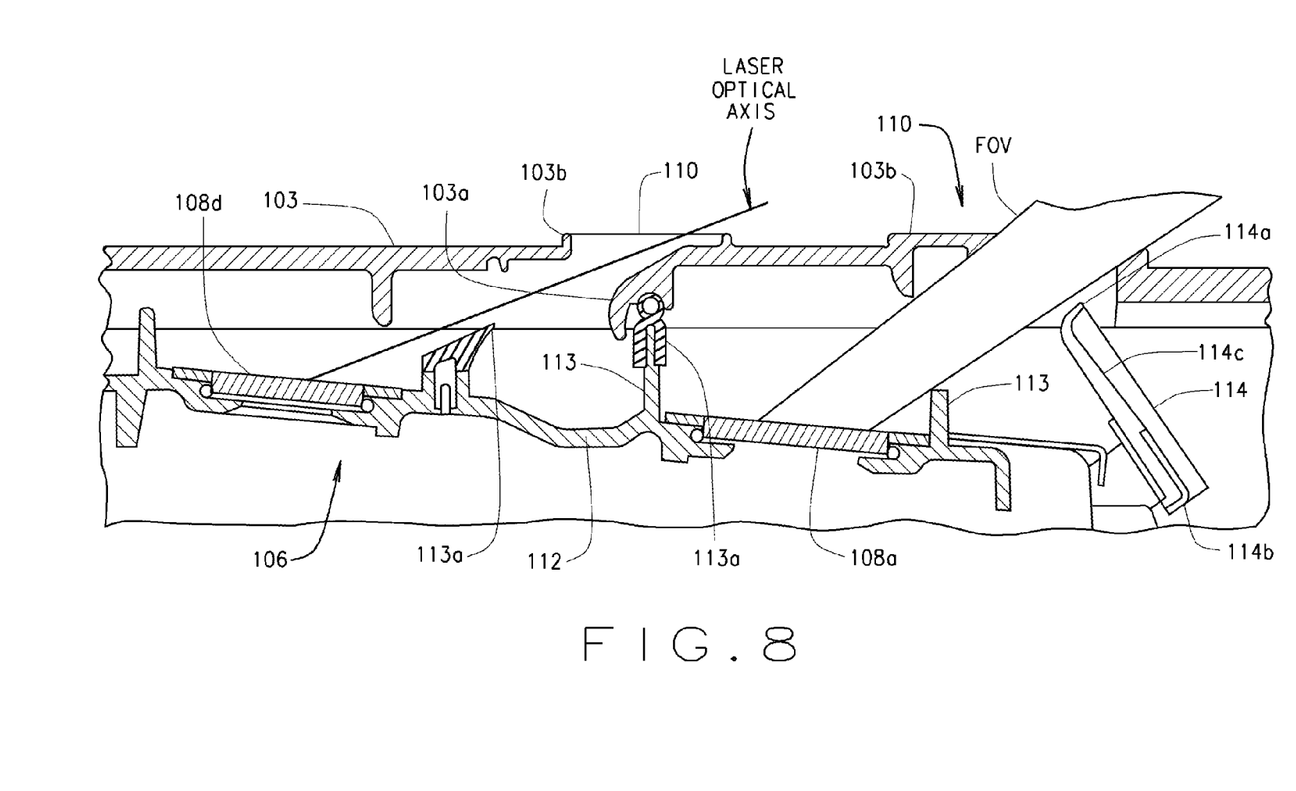
FIG. 8 is a close-up side section view of an embodiment of the drive-over tire tread depth optical sensor system, illustrating cover plate features, gutters, deflecting lips and baffles.

Environmental contaminates and debris falling directly through the openings 110 in the vehicle support surface 102 or cover plate 103 may be captured within one or more gutters 112 disposed on the upper surface of the sensor housing 106 between the optical window pairs (108a, 108d) and (108b, 108c), in vertical alignment with the openings 110. Preferably, each gutter 112 extends parallel to the optical windows 108, and includes raised sidewalls 113 which are continuous along each longitudinal edge. As best seen in FIGS. 5 and 8, one or more of the raised sidewalls 113 of each gutter 112 have a maximum height and/or optional contoured upper edge 113a formed into a baffle or deflecting lip, which is limited by the laser optical axis and/or optical imaging sensor field of view, ensuring an unobstructed line of sight for the laser emitters or optical imaging sensors between the optical windows 108 and the associated vehicle support surface or cover plate openings 110. Environmental contaminates or debris deposited into the gutters 112 are prevented from migrating or flowing onto the optical windows 108 by the sidewalls 113, and are directed in a generally lateral direction for discharge off the side edges of the sensor housing 106.

When the sensor system 100 is not acquiring images or in use, some or all of the openings 110 in the vehicle support surface 102 or cover plate 103 may be fully or partially closed by actuated shutters 114. As best seen in FIGS. 3, 4, 6, and 7, an actuated shutter 114 associated with at least one of the openings 110 may be mounted to the sensor housing 106, together with an associated actuation mechanism. The actuation mechanism may include a shutter actuator 116 linked by a mechanical coupling 117 to a shutter actuation cam 118 for articulating movement of the actuated shutter 114 between an open position (shown in FIGS. 3, 5, 6, 8) and a closed position (shown in FIGS. 4, 7) which at least partially closes an opening 110 in the vehicle support surface 102 or cover plate 103. The actuation mechanism as shown in FIGS. 3 and 4 is pneumatically operated, suitably coupled to a remote source of pressurized air. Those of ordinary skill in the art will recognize that a wide variety of actuation mechanisms may be utilized, including mechanical, electrical, and hydraulic systems. Similarly, while FIGS. 3-7 illustrate the use of the shutter actuating cam 118 coupled to the mechanical coupling for articulating the movement of each shutter 114 between an open position and a closed position, any of a variety of suitable mechanical mechanisms may be utilized, including, but not limited to, hinges, levers, and pivots.

Figure 6:
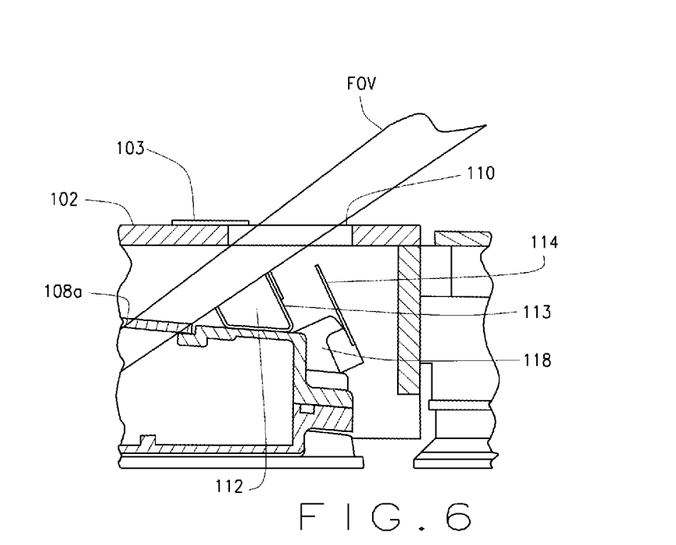
FIG. 6 is a close-up view of a portion of FIG. 5, illustrating placement of drip guards, gutters, and a mechanical shutter in the open position.
Figure 7:
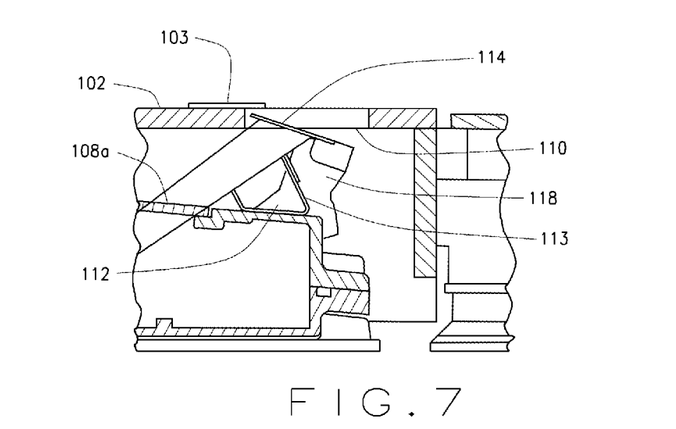
FIG. 7 is a close-up section view similar to FIG. 6, illustrating the placement of drip guards, gutters, and a mechanical shutter in the closed position.

As best seen in FIGS. 6 and 7, it is preferable that the shutter 114 be disposed below the upper surface of the vehicle support surface 102 or cover plate 103 in both the open and closed positions, for protection against damage in both positions, and to avoid interference with an laser optical axis or the optical imaging sensor field of view when in the open position. The shutter 114 may be composed of a lighter gauge material than the vehicle support surface 102 or cover plate 103, having sufficient durability for exposure to environmental debris and contaminates. As shown in FIG. 7, when in a closed configuration, the shutter 114 need not fully seal or close an associated opening 110, but rather, may act as a deflecting surface with appropriate lips 114a, edges 114b, and recessed regions 114c (as shown in FIGS. 4 and 8) to direct incoming environmental contaminates and debris which fall through the opening 110 away from sensitive regions on the underlying surfaces of the sensor housing 106. Preferably, the shutter 114 has dimensions which are larger than the opening 110 with which it is associated, such that environmental contaminates or debris passing through the opening 110 may not fall past the lips 114a of the shutter 114 when the shutter is in the closed position.

For some applications, the cover plate 103 may optionally be mounted to the vehicle support surface 102 in proximity to one or more openings 110, in such a manner as to extend partially over, and into, the openings without interference with an optical axis or field of view passing there through. The cover plate 103 functions in cooperation with the shutter 114 (if present) to divert incoming environmental contaminates or debris onto the surface of the shutter. As seen in FIGS. 2 and 8, a rolled or rounded edge or lip 103a of the cover plate 103 may extend inward towards the sensor housing, and serve to collect, control, or divert liquid contaminates (i.e., water, oil, salt solutions, etc.) to thereby form droplets or fluid flows at controlled locations relative to the sensor housing 106 below by taking advantage of liquid surface tension, adhesion characteristics, and air flow. Similarly, raised edges 103b of the cover plate 103 above the surface of the vehicle support surface 102 further serve to divert fluid flow of liquids accumulating on the vehicle support surface 102 away from the openings 110.

Incoming liquid contaminates may be further controlled by application of suitable surface coatings on the sensor housing 106 and optical windows 110, as well as surface textures, grooves, lips and drip edges formed on the various surfaces, such as the underside surface of the cover plate 103 to encourage droplet formation over the gutters 112, and to divert liquid flows away from the optical windows 108. Exemplary coatings which may be applied to any of the exposed surfaces on the sensor housing, such as the optical windows 108 or gutters 112, include optically transparent nano-coatings, hydrophobic coatings, and other surface coatings which resist adhesion and/or encourage beading of liquid contaminates.

Environmental contaminates, debris, and liquids which pass through the openings 110 in the vehicle support surface 102 and/or cover plate 103, and which accumulate or collect on the upper surfaces of the sensor housing 106, including the optical windows 108 and within the gutters 112 must be periodically removed. Manual removal of accumulated material requires removal of the vehicle support surface 102 to access the underlying surface of the sensor housing 106, and is not always convenient or practical. In an embodiment of the present invention, an automated system for the clearing of accumulated debris from the sensor housing surfaces is provided. The cleaning system, best seen in FIGS. 3 and 4, consists of one or more air knife or air blade assemblies 122, each of which are configured with one or more air nozzles 124 to direct a flow or blast of pressurized air across the surfaces of the sensor housing. As best seen in FIG. 3, a pair of air knife assemblies 122 may be disposed along the longitudinal midline of the sensor housing 106, laterally between adjacent optical windows 108 and gutters 112. Each air knife assembly 122 includes air nozzles or discharge openings 124 which are oriented to direct a flow or blast of pressurized air laterally outward towards the lateral edges of the sensor housing 106. For example, as seen in FIG. 4, at least one air nozzle 124 is associated with each optical window 108 and each gutter 112.

During operation, pressurized air is periodically delivered to the air knife assemblies 122 and discharged through the air nozzles 124. The discharged flow or blast of pressurized air displaces accumulated contaminates, debris, or liquids from the surface of the sensor housing 106, optical windows 108, and/or gutters 112 in a laterally outward direction, off the lateral edges of the sensor housing 106 and into a surrounding discharge area. While shown in FIGS. 3 and 4 in a configuration which enables the lateral discharge of accumulated contaminates, debris, and liquids, those of ordinary skill will recognize that the air knife assemblies 122 and air nozzles 124 may be configured to direct the flow or blasts of pressurize air in other directions relative to the surface of the sensor housing 106 as necessitated by the configuration of the optical windows 108, gutters 112, and other components located in proximity thereto, without departing from the scope of the present invention.

In an alternate embodiment, the air knife assemblies 122 are either replaced by, or supplemented with, wiper mechanisms (not shown) configured to sweep one or more wiper blades across the various surfaces to displace any accumulated contaminates, debris or liquids from the surface of the sensor housing 106, optical windows 108, and/or gutters 112. Preferably, the wiper mechanisms are configured to sweep the material in a laterally outward direction, off the lateral edges of the sensor housing 106 and into a surrounding discharge area.

For some applications it may be beneficial to apply a spray of cleaning solution to the optical windows 108 prior to, or in conjunction with, the discharge of pressurized air from the associated air nozzles 124 or the sweeping action of a wiper mechanism. A suitable cleaning solution delivery system (not shown) may be disposed in operative proximity to the optical windows 108, or may be incorporated into the air knife assemblies 122. Alternatively, a cleaning solution may be supplied directly to the air knife assemblies and delivered to the optical windows 108 directly through the air nozzles 124 with the flow or blasts of pressurized air.

Control of the active mechanisms for protection against environmental contaminate and debris ingress, as well as the periodic clearing of accumulated material may be manual or automatic. Preferably, operation of the shutters 114 is controlled automatically by a suitably configured processing system (not shown), such that the shutters 114 remain in a closed position as a default, and are opened only when necessary to enable the acquisition of tire tread images by the optical imaging sensors, such as when a drive-over trigger mechanism 104 is activated by a vehicle approaching the sensor assembly 100.

Operation of the air knife assemblies 122 is similarly handled by a suitably configured processing system (not shown). The processing system may be programmed with software instructions to activate the air knife assemblies 122 upon each activation of the drive-over trigger mechanism 104, on a fixed cyclical basis such as after set number of tire tread images are acquired, on a fixed time schedule such as after every hour of operation, or on a variable basis by monitoring the quality of acquired images to identify the presence of accumulating debris or contaminates on the optical windows 108.

While the present disclosure and accompanying figures are seen to illustrate a drive-over tire tread depth sensor system 100 which incorporates multiple environmental protection features, including mechanical shutters 114, gutters 112, and air knife assemblies 122, those of ordinary skill in the art will recognize that other combinations of environmental protection features may be utilized without departing from the scope of the present disclosure, depending upon the particular configuration and/or operating environment in which a drive-over optical sensor system is to be utilized.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A drive-over optical tire tread depth sensor system, comprising:
   a vehicle support surface configured to support a wheel assembly, said vehicle support surface including an opening;
   a sensor housing containing an optical component disposed in proximity disposed relative to, and spaced from, an underside of said vehicle support surface, said optical component having an optical axis or field of view aligned to pass through said opening at an acute angle;
   wherein said sensor housing is biased towards said underside of said vehicle support surface; and
   wherein at least a portion of said vehicle support surface is removable for access to said optical component.

2. The system of claim 1 wherein said optical component is a laser, and said optical axis is a laser projection axis.

3. The system of claim 1 wherein said optical component is an imaging sensor and said field of view is an optical imaging sensor field of view.

4. The system of claim 1 wherein said optical component is offset along a longitudinal axis of the sensor system from said opening in said vehicle support surface through which said associated optical axis or field of view passes, such that said optical component is not in vertical alignment with said opening.

5. The system of claim 1 further including least one deflecting surface associated with said opening, said deflecting surface configured to deflect, away from said optical component, environmental contaminates and debris descending through said opening.

6. The system of claim 1 wherein said sensor housing further includes a second optical component laterally adjacent to and aligned with said optical component, said second optical component having a second optical axis or field of view;
  wherein said vehicle support surface further includes a second opening associated with said second optical axis or field of view; and
  wherein said second optical component is disposed relative to, and spaced apart from said underside of said vehicle support surface, such that said second optical axis or field of view is aligned to pass through said second opening at an acute angle.

7. The system of claim 1 wherein said sensor housing further includes a second optical component longitudinally adjacent to and aligned with said optical component, said second optical component having a second optical axis or field of view;
  wherein said vehicle support surface further includes a second opening associated with said second optical axis or field of view; and
  wherein said second optical component is disposed relative to, and spaced apart from said underside of said vehicle support surface, such that said second optical axis or field of view is aligned to pass through said second opening at an acute angle.

8. The system of claim 1 further including a gutter disposed below said vehicle support surface, said gutter configured to prevent a flow or migration of accumulated environmental contaminates or debris from entering said optical axis or field of view.

9. The system of claim 1 further including a cover plate mounted to the vehicle support surface, said cover plate surrounding said opening without interference with said optical axis or field of view passing through said opening; and
  wherein said cover plate is configured to divert environmental contaminates or debris away from said opening.

10. An improved drive-over optical tire tread depth measurement system having an optical component with an optical axis or field of view, the optical component disposed in spaced proximity to an underside of the vehicle support surface, said vehicle support surface having at least one opening in alignment with the optical axis or field of view, the improvement comprising:
  at least one environmental protection feature selected from a set of environmental protection features including a fixed fluid flow deflecting element within said at least one opening and an entrapping gutter below said at least one opening; and
  wherein said at least one environmental protection feature is disposed to avoid interference with said optical axis or field of view.

11. The improved drive-over optical tire tread depth measurement system of claim 10 wherein at least a portion of said vehicle support surface or cover plate is removable for access to said optical component.

12. The improved drive-over optical tread depth measurement system of claim 10 wherein said fixed fluid flow deflecting element is configured to deflect, away from said optical component, environmental contaminates and debris entering through said opening.

13. The improved drive-over optical tread depth measurement system of claim 10 wherein said entrapment gutter is configured to prevent accumulated environmental contaminates or debris from entering said optical axis or field of view.

14. The improved drive-over optical tread depth measurement system of claim 10 wherein said at least one opening in said vehicle support surface or cover plate is longitudinally offset from said optical component.

15. A drive-over optical tire tread depth sensor system, comprising:
  an optical component having an illuminating laser optical axis and an optical imaging sensor field of view;
  a vehicle support surface in spaced apart proximity above said optical component, said vehicle support surface having at least one opening in optical alignment with said optical axis and said field of view; and
  an air discharge system disposed in proximity to said optical component, said air discharge system including at least one air discharge oriented to direct pressurized air to laterally displace environmental contaminates, debris or liquids accumulated between an underside of said vehicle support surface and said optical component from said optical axis or field of view.

16. The system of claim 15 including a shutter assembly disposed between said underside of said vehicle support surface and said optical component, said shutter assembly having a shutter operable between a closed position adjacent said underside of said vehicle support surface and at least partially occluding said at least one opening in said vehicle support surface, and an open position in which said shutter is displaced away from said underside of said vehicle support surface and from said optical axis or field of view.

17. The system of claim 16 wherein said shutter assembly includes an actuator configured to actuate said shutter between said closed position and said open position; and
  further including a control system configured with software instructions to regulate operation of said actuator by coordinating actuation with operation of said optical component.

18. The system of claim 15 wherein said at least one air discharge is an air knife assembly having at least one air nozzle configured to provide a lateral discharge of air between said optical component and said underside of said vehicle support surface.

19. An improved drive-over optical tire tread depth sensor system having an optical axis or field of view associated with an optical component disposed in spaced apart proximity to an underside of a vehicle support surface having at least one opening in alignment with the optical axis or field of view, the improvement comprising:
  at least one environmental protection feature selected from a set of environmental protection features including a movable shutter disposed below said underside of said vehicle support surface and associated with said at least one opening, a fluid flow deflecting element on said vehicle support surface in proximity to said at least one opening, an entrapping gutter below said at least one opening, a wiper mechanism configured to sweep a wiper across said at least one optical axis or field of view, and an air discharge assembly for periodically discharging a flow or blast of pressurized air laterally across said at least one optical axis or field of view below said underside of said vehicle support surface.

20. A method for preventing an accumulation of environmental contaminates, debris, or liquids on a surface of a drive-over optical tire tread depth sensor system disposed in spaced proximity below an underside of a vehicle support surface having at least one opening in alignment with an illuminating laser optical axis or an optical imaging sensor field of view, comprising:

activating an air discharge assembly disposed below said underside of said vehicle support surface to laterally discharge a flow of pressurized air beneath said underside of said vehicle support surface to laterally displace accumulated contaminates, debris, or liquids from said illuminating laser optical axis or said optical imaging sensor field of view.

* * * * *

UNITED STATES PATENT AND TRADEMARK OFFICE
CERTIFICATE OF CORRECTION

PATENT NO. : 9,677,973 B1
APPLICATION NO. : 14/625345
DATED : June 13, 2017
INVENTOR(S) : Craig A. Carroll and Michael T. Stieff It is certified that error appears in the above-identified patent and that said Letters Patent is hereby corrected as shown below:

In Claim 1, at Column 8, Lines 56 and 57; after "optical component", delete "disposed in proximity"

Signed and Sealed this
Seventeenth Day of October, 2017

Joseph Matal
*Performing the Functions and Duties of the
Under Secretary of Commerce for Intellectual Property and
Director of the United States Patent and Trademark Office*